United States Patent
Lee et al.

(10) Patent No.: US 9,169,365 B2
(45) Date of Patent: Oct. 27, 2015

(54) COPOLYMERIZED POLYESTER HEAT SHRINKABLE FILM

(75) Inventors: Roy Lee, Seoul (KR); Jong-Ryang Kim, Gyeonggi-do (KR); Won-Jae Yoon, Seoul (KR)

(73) Assignee: SK CHEMICALS CO., LTD., Seongnam-Si (KR)

( * ) Notice: Subject to any disclaimer, the term of this patent is extended or adjusted under 35 U.S.C. 154(b) by 0 days.

(21) Appl. No.: 13/509,511

(22) PCT Filed: Nov. 12, 2010

(86) PCT No.: PCT/KR2010/007981
§ 371 (c)(1),
(2), (4) Date: May 11, 2012

(87) PCT Pub. No.: WO2011/059252
PCT Pub. Date: May 19, 2011

(65) Prior Publication Data
US 2012/0226014 A1    Sep. 6, 2012

(30) Foreign Application Priority Data
Nov. 13, 2009   (KR) .................. 10-2009-0109610

(51) Int. Cl.
| | | |
|---|---|---|
| B29C 69/02 | (2006.01) | |
| C08J 5/18 | (2006.01) | |
| B29C 55/08 | (2006.01) | |
| B29C 61/00 | (2006.01) | |
| C08G 63/199 | (2006.01) | |
| B29K 67/00 | (2006.01) | |
| B29K 105/00 | (2006.01) | |
| B29K 105/02 | (2006.01) | |

(52) U.S. Cl.
CPC . *C08J 5/18* (2013.01); *B29C 55/08* (2013.01); *B29C 61/003* (2013.01); *B29K 2067/00* (2013.01); *B29K 2105/0085* (2013.01); *B29K 2105/02* (2013.01); *C08J 2367/02* (2013.01)

(58) Field of Classification Search
CPC ............ C08G 63/199; C08G 64/0208; C08G 64/305; C08G 2650/34; C08G 63/80; C08G 63/83; B29K 2067/00; B29K 2009/00; B29K 2023/06; B29K 2023/086; B29K 2023/12; B29K 2069/00; B29K 2077/00; B29K 2105/009; B29K 2105/0085; B29K 2105/02; C08J 5/18; C08J 2367/02
USPC ....................... 528/298; 264/210.1
See application file for complete search history.

(56) References Cited

U.S. PATENT DOCUMENTS

| | | | |
|---|---|---|---|
| 5,958,581 A | 9/1999 | Khanarian et al. | |
| 6,914,120 B2 * | 7/2005 | Germroth et al. | ............ 528/300 |

FOREIGN PATENT DOCUMENTS

| | | | |
|---|---|---|---|
| JP | 05-245930 | * | 9/1993 |
| JP | 2001-72841 A | | 3/2001 |
| JP | 2002-113835 A | | 4/2002 |
| JP | 2002-120268 A | | 4/2002 |
| JP | 2002-512303 A | | 4/2002 |
| JP | 2007-197651 A | | 8/2007 |
| KR | 2001-0034805 A | | 4/2001 |

* cited by examiner

*Primary Examiner* — Ling Choi
*Assistant Examiner* — Gennadiy Mesh
(74) *Attorney, Agent, or Firm* — Birch, Stewart, Kolasch & Birch, LLP

(57) ABSTRACT

A copolymerized polyester heat shrinkable film which can be used as a label, a cap seal or a direct packaging for various containers is disclosed. The copolymerized polyester heat shrinkable film is made of a copolymerized polyester resin having alternating structures of acid moieties which are derived from acid components and diol moieties which are derived from diol components, the acid components comprising terephthalic acid, and the diol components comprising isosorbide 1,4-cyclohexanedimethanol and ethylene glycol. The copolymerized polyester heat shrinkable film has a shrinkage initiation temperature of equal to or more than 60° C., and a maximum heat shrinkage ratio of less than 2% at 60 to 70° C., and a maximum heat shrinkage ratio of 50 to 90% at 90 to 100° C.

6 Claims, No Drawings

COPOLYMERIZED POLYESTER HEAT SHRINKABLE FILM

This application is the National Phase of PCT/KR2010/007981 filed on Nov. 12, 2010, which claims priority under 35 U.S.C. §119(a) to Patent Application No. KR 10-2009-0109610 filed in Korea on Nov. 13, 2009, all of which are hereby expressly incorporated by reference into the present application.

FIELD OF THE INVENTION

This invention relates to a copolymerized polyester heat shrinkable film, and more particularly, to a copolymerized polyester heat shrinkable film which can be used as a label, a cap seal or a direct packaging for various containers.

BACKGROUNDS OF THE INVENTION

Heat shrinkable plastic products are widely used in the field of film such as a shrinkable packaging, a shrinkable label, and so on due to their shrinking property when heated. Specifically, polyvinylchloride (PVC), polystyrene or polyester based plastic film has been used as a label, a cap seal or a direct packaging for various containers.

However, in case of the polyvinylchloride (PVC) film, hydrogen chloride gas, dioxin precursors and so on are produced when incinerated. Thus, the use of the material is not environmentally desirable. In addition, when the PVC film is used as a shrinkable label for a polyethylene terephthalate (PET) container, the label and the container should be separated for recycling the container.

The polystyrene film has a good stability during a shrinking process and has a good appearance. On the other hand, the polystyrene film is not good in a chemical resistance, and thus special ink compositions should be used to print on the film. In addition, the polystyrene film has a poor storage stability at room temperature, and therefore the dimensions of the film are liable to change due to its natural shrinkage.

The polyester film does not have the drawbacks in an environmental aspect and in the chemical resistance, and is considered as a substitute heat shrinkable film replacing the two above-mentioned materials. As the use of a PET container increases, the use of a shrinkable label made of the polyester film also increases because an additional label separating process is not necessary for recycling the PET container.

However, the conventional heat shrinkable polyester film has a low heat resistance, which requires a new improvement. Specifically, when a shrinkable label made of the heat shrinkable polyester film is affixed on a container, and the container is exposed to heat (for example, when hot drink (60 to 70° C.) is contained in the container), the shrinkable label may be further shrunk and deformed. Therefore, the label can be deformed from its original desired shape.

SUMMARY OF THE INVENTION

It is an object of the present invention to provide a copolymerized polyester heat shrinkable film which has a improved heat resistance (a reduced heat shrinkage ratio) at a specific temperature range (60 to 70° C.).

To accomplish these objects, the present invention provides a copolymerized polyester heat shrinkable film made of a copolymerized polyester resin having alternating structures of acid moieties which are derived from acid components and diol moieties which are derived from diol components, the acid components comprising terephthalic acid, and the diol components comprising isosorbide represented by Formula 1 and ethylene glycol,

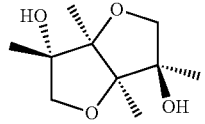

[Formula 1]

wherein the copolymerized polyester heat shrinkable film has a shrinkage initiation temperature of equal to or more than 60° C., and a maximum heat shrinkage ratio of less than 2% at 60 to 70° C., and a maximum heat shrinkage ratio of 50 to 90% at 90 to 100° C.

The copolymerized polyester heat shrinkable film according to the present invention has an increased heat resistance. A heat shrinkable label made of the copolymerized polyester film shrinks by applying the heat of 90 to 100° C. Therefore, when hot drink of a high temperature (60 to 70° C.) is injected into a bottle on which the heat shrinkable label is affixed, the deformation and shrinkage of the label can be prevented. Accordingly, the copolymerized polyester heat shrinkable film of the present invention is useful for a label, a cap seal, a direct packaging or so on of various containers.

DETAILED DESCRIPTION OF THE INVENTION

A more complete appreciation of the invention, and many of the attendant advantages thereof, will be better appreciated by reference to the following detailed description.

The copolymerized polyester heat shrinkable film according to the present invention is made of a copolymerized polyester resin having alternating structures of acid moieties which are derived from acid components and diol moieties which are derived from diol components, the acid components comprising terephthalic acid, and the diol components comprising isosorbide represented by Formula 1 and ethylene glycol.

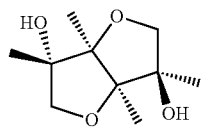

[Formula 1]

The acid components used in the present invention include terephthalic acid as a main component. That is, the total acid components can be terephthalic acid component, or the acid components includes the terephthalic acid component and some amount of a copolymerized acid component (copolymerized monomer) selected from the group consisting of aromatic dicarboxylic acid components of 8 to 14 carbon atoms and aliphatic dicarboxylic acid components of 4 to 12 carbon atoms for improving the properties of the polyester resin. The amount of the copolymerized acid component, for improving the properties of the polyester resin, is preferably 0 to 50 mole %, for example 0.1 to 40 mol %, and more preferably 1 to 10 mol % with respect to the total acid components. If the amount of the copolymerized acid component is too little or too much, the property improving effect may not be sufficient, or even the properties of the polyester resin may be deteriorated. The aromatic dicarboxylic acid components of 8 to 14 carbon atoms include aromatic dicarboxylic acid components conventionally used for preparing a polyester resin, such as isophthalic acid, naphthalene dicarboxylic acid such as 2,6-naphthalene dicarboxylic acid, diphenyl dicarboxylic acid and so on, and does not include the terephthalic acid component. The aliphatic dicarboxylic acid components of 4 to 12 carbon atoms include a linear, branched or cyclic aliphatic dicarboxylic acid components conventionally used for preparing a polyester resin, such as cyclohexane dicarboxylic acid (for example, 1,4-cyclohexane dicarboxylic acid, 1,3-cyclohexanedicarboxylic acid), phthalic acid, sebacic acid, succinic acid, isodecylsuccinic acid, maleic acid, fumaric acid, apidic acid, glutaric acid, azelaic acid, and so on. The acid components may include only one acid component or two or more acid components (mixtures). In the present specification, the term "terephthalic acid component" is used to include terephthalic acid, alkyl ester thereof (lower alkyl ester of 1 to 4 carbon atoms such as monomethyl, monoethyl, dimethyl, diethyl or dibutyl ester etc) and/or acid anhydride thereof so that the terephthalic acid component reacts with the glycol components to form a terephthaloyl moiety. Also, in this specification, the acid moiety and the diol moiety indicate residues of the acid component and the diol component from which hydrogen, hydroxyl group or alkoxy group are removed by the conventional polyester polymerization reaction.

The diol components used in the present invention include isosorbide represented by Formula 1 and ethylene glycol, and optionally may further include 1,4-cyclohexanedimethanol for improving processability (mouldability) or other properties of the polymer. For example, the diol components include isosorbide of 0.1 to 60 mol %, preferably 0.5 to 40 mol %, more preferably 1 to 30 mol %, most preferably 5 to 15 mol %, 1,4-cyclohexanedimethanol of 0 to 90 mol %, preferably 10 to 80 mol %, more preferably 15 to 30 mol % and ethylene glycol as the remainder. When the amount of isosorbide of Formula 1 is less than 0.1 mol % with respect to the total diol components, the heat resistance of the heat shrinkable film may not be improved. When the amount of isosorbide of Formula 1 is more than 60 mol % with respect to the total diol components, the heat resistance may become excessive, and the shrink processability of the heat shrinkable film may not be sufficient. 1,4-cyclohexanedimethanol can be cis-isomer, trans-isomer or mixture of the two isomers. When the amount of 1,4-cyclohexanedimethanol is too little, the impact strength may be insufficient. If the amount of 1,4-cyclohexanedimethanol is too much, the amount of isosorbide relatively decreases, and thereby the heat resistance may be deteriorated, and the processability may be deteriorated due to a crystallization.

As the remaining component of the diol components, ethylene glycol can be used so that the total amount of the diol components becomes 100 mol %. Optionally, the diol components may further include one or more following diol additional components. Examples of the additional diol components include propane-1,2-diol, 2,2-methyl-1,3-propanediol, 2-methyl-1,3-propanediol, 2-dimethyl-1,3-propanediol, 2-methyl-2-ethyl-1,3-propanediol, 2-methyl-isopropyl-1,3-propandiol, 2-methyl-2-n-propyl-1,3-propanediol, 1,1-ethyl-n-butyl-1,3-propanediol, 2-n-propyl-2-n-butyl-1,3-propanediol, 2,2-di-n-propyl-1,3-propanediol, 2-ethyl-n-propyl-1,3-propanediol, 2-ethyl-isopropyl-1,3-propanediol, 2-methyl-n-butyl-1,3-propanediol, 2,2-diethyl-1,3-propanediol, 1,4-butanediol, 2,3-dimethyl-1,4-butanediol, 2-methyl-1,4-butanediol, 2-ethyl-1,4-butanediol, 2,3,4-trimethyl-1,5-pentanediol, 2-methyl-2-hexyl-1,3-propanediol, 2-butyl-2-ethyl-1,3-propanediol, 3-methyl-1,5-pentanediol, 2-methyl-1,5-pentanediol, 2-methyl-2-hexyl-1,3-propanediol, 2,3-dimethyl-2,3-butanediol, 1,6-hexanediol, 2,2,4,4-tetramethyl-1,3-cyclobutanediol, polyethylene glycol such as diethylene glycol, triethylene glycol and so on, polypropylene glycol, polyoxy tetra methylene glycol, ether glycol such as bisphenol compound or its alkylene oxide derivatives, dimer diol or mixtures thereof. The amount of the additional diol components can be 0.1 to 20 mol %, preferably 1 to 10 mol % with respect to the total diol components under the condition that the additional diol components do not deteriorate the properties of the polyester resin.

The copolymerized polyester resin of the present invention is prepared by an esterification reaction (Step 1) and a polycondensation reaction (Step 2). The esterification reaction (Step 1) can be carried out in a batch-wise manner or in a continuous manner. Each reactant (acid components and diol components) can be introduced into a reactor separately, but it is preferable to introduce a slurry including the diol components and the acid components into the reactor.

The polymerization method of the polyester resin of the present invention will be explained in more detail hereinafter. First, the diol components are introduced in the amount of 1.05 to 3.0 times by mole ratio with respect to the acid components such as terephthalic acid and so on. Then, the esterification reaction is carried out at the temperature of 200 to 300° C., preferably 210 to 290° C., more preferably 230 to 280° C. and at the increased pressure of 0.1 to 3.0 kg/cm$^2$, preferably 0.2 to 3.0 kg/cm$^2$. When the mole ratio of the diol components to the acid components is less than 1.05, unreacted acid components may remain after the polymerization reaction so that the transparency of the resin may be deteriorated. When the mole ratio is more than 3.0, the polymerization reaction rate may become slow and the productivity of the resin may decrease. The reaction time of the esterification reaction (average retention time) is generally 100 minutes to 20 hours, preferably 2 hours to 18 hours, which can be varied according to a reaction temperature, a reaction pressure and the mole ratio of diol components to acid components. When the process for preparing copolymerized polyester resin is classified into the esterification reaction (Step 1) and the polycondensation reaction (Step 2), the esterification reaction does not require catalyst, but catalyst can be used to reduce the reaction time.

After completion of the esterification reaction (Step 1), the polycondensation reaction (Step 2) is carried out. Before the initiation of the polycondensation reaction, a polycondensation catalyst, a stabilizer, a colorant and other additives can be added to the product of the esterification reaction. Examples of the polycondensation catalyst include conventional a titanium based catalyst, a germanium based catalyst, an antimony based catalyst, an aluminum based catalyst, a tin based catalyst, and mixtures thereof. As the stabilizer for the polycondensation reaction, conventional phosphor based stabilizers, such as phosphoric acid, trimethyl phosphate, triethyl phosphate, and so on, can be used. Preferably, the stabilizer is introduced so that the amount of phosphorus of the stabilizer is 10 to 100 ppm with respect to the total weight of the produced polymer. When the amount of phosphorus of the stabilizer is less 10 ppm, the polyester may not be sufficiently stabilized and the color of the polymer may become yellow. When the amount of phosphorus is more than 100 ppm, the polymerization degree of the polymer may be insufficient. The colorant is added to improve the color property of the polymer. Examples of the colorant include conventional colorant such as cobalt acetate, cobalt propionate, and so on. If necessary, an organic colorant can also be used as the colorant. The preferable amount of the colorant is 0 to 100 ppm with respect to the weight of the produced polymer. Generally, the polycondensation reaction is carried out at the temperature of 260 to 290° C., preferably 260 to 280° C., more preferably 265 to 275° C. and at the reduced pressure of 400 to 0.1 mmHg. The reduced pressure of 400 to 0.1 mmHg is maintained in order to remove by-products (glycol) of the polycondensation reaction. The polycondensation reaction can be carried out until a desirable intrinsic viscosity of the polyester resin can be obtained, and, for example, can be carried out during an average retention time of 1 to 20 hours.

The copolymerized polyester heat shrinkable film according to the present invention can be prepared by a conventional method for preparing a heat shrinkable film. For example, the heat shrinkable film can be prepared by extruding the polyester with a blowing extruder or a twin-screw extruder, and then stretching the extruded polyester by 1 to 4 times in a transverse (TD) direction. The thickness of the copolymerized polyester heat shrinkable film prepared by the method is generally 20 μm to 1 mm.

A shrinkage initiation temperature of the copolymerized polyester heat shrinkable film is 60° C. and more, preferably 65 to 90° C. The maximum heat shrinkage ratio thereof is less than 5%, preferably 0 to 2% at 60 to 70° C., and the maximum heat shrinkage ratio thereof is 50 to 90%, preferably 60 to 85% at 90 to 100° C. If the shrinkage initiation temperature is out of the above-mentioned range, the film may be deformed at room temperature. If the maximum heat shrinkage ratio at 60 to 70° C. is out of the above-mentioned range, the shrinkable label may be shrunk and deformed when hot drink (60 to 70° C.) is poured to the container on which the shrinkable label made of the heat shrinkable film is affixed. In addition, if the maximum heat shrinkage ratio at 90 to 100° C. is out of the above-mentioned range, the heat shrinkable film cannot be sufficiently processed (i.e., shrunk), and the film is not suitable as the label, the cap seal or the direct packaging of various containers.

Hereinafter, specific examples are provided to illustrate the present invention in more detail, but the present invention is not restricted or limited by the following examples.

In the following examples and comparative examples, the physical properties were measured as follows.

(1) Glass Transition Temperature (Tg): The glass transition temperature for evaluating the heat resistance, was measured with a Differential Scanning Calorimeter (Manufactured by TA Instruments). The heat shrinkable film was annealed at 300° C. for 5 minutes, cooled to room temperature, and then heated ($2^{nd}$ scan) with a temperature increasing rate of 10° C./minute. The Tg was measured during the $2^{nd}$ scan.

(2) Heat shrinkage ratio: A heat shrinkable film was cut by 10 cm×10 cm rectangular size to produce a sample. The sample was immersed into warm water of the temperature shown in Table 1 (65° C. and 95° C.) for 10 seconds without a load to carry out the thermal shrinkage. Then the sample was immersed into water of 25° C. for 10 seconds. Then, the width and the length of the sample were measured, and the heat shrinkage ratio was calculated with the following equation.

Heat shrinkage ratio (%)=100×(length before shrinkage−length after shrinkage)/(length before shrinkage)

(3) Specific melting resistivity (Si): A heat shrinkable film was melted at 275° C., and a pair of electrode plates was inserted thereto. Voltage of 120 V was applied to the electrodes and the electric current was measured. The specific melting resistivity (Si, unit: Ω·cm) was calculated with the following equation (A: Area of electrode ($cm^2$), I: Distance between electrodes (cm), V: voltage (V), io: electric current (A)).

Specific melting resistivity $(Si)=(A/I)\times(V/io)$

Manufacturing Example 1

Preparation of Copolymerized Polyester Resin

Reactants were introduced into a 3 L reactor equipped with a stirring apparatus and a condenser, wherein the reactants included terephthalic acid as the acid components and 16 mol % of 1,4-cyclohexanedimethanol, 78 mol % of ethylene glycol and 6 mol % of isosorbide as the diol components, and the mole ratio of the total diol components with respect to the total acid components was maintained to 1.05 to 3.0. The temperature of the reactor was slowly increased to 255° C. to carry out the esterification reaction. Water produced during the esterification reaction was removed from the reaction system. After completion of the production and the removal of water, the reactants (product of esterification reaction) were transferred to a polycondensation reactor equipped with a stirring apparatus, a cooling condenser, and a vacuum system. Then, a catalyst, a heat-stabilizer and a colorant were added to the product of the esterification reaction. Then, the temperature of the reactor was increased to 240° C.~275° C., and the pressure of the reactor was decreased from atmospheric pressure to 50 mmHg while removing ethylene glycol for 40 minutes during a low pressure reaction (first stage). The pressure was further slowly decreased to 0.1 mmHg, and the polycondensation reaction was further carried out until a desired intrinsic viscosity was obtained under the high vacuum state to prepare the copolymerized polyester resin.

Manufacturing Example 2

Preparation of Copolymerized Polyester Resin

Except for using 16 mol % of 1,4-cyclohexanedimethanol, 69 mol % of ethylene glycol and 15 mol % of isosorbide instead of 16 mol % of 1,4-cyclohexanedimethanol, 78 mol % of ethylene glycol and 6 mol % of isosorbide as the diol components, the copolymerized polyester resin was prepared according to the same manner of Manufacturing example 1.

Manufacturing Example 3

Preparation of Copolymerized Polyester Resin

Except for using 16 mol % of 1,4-cyclohexanedimethanol, 60 mol % of ethylene glycol and 24 mol % of isosorbide instead of 16 mol % of 1,4-cyclohexanedimethanol, 78 mol % of ethylene glycol and 6 mol % of isosorbide as the diol components, the copolymerized polyester resin was prepared according to the same manner of Manufacturing example 1.

Manufacturing Example 4

Preparation of Copolymerized Polyester Resin

Except for using 76 mol % of ethylene glycol and 24 mol % of isosorbide instead of 16 mol % of 1,4-cyclohexanedimethanol, 78 mol % of ethylene glycol and 6 mol % of isosorbide as the diol components, the copolymerized polyester resin was prepared according to the same manner of Manufacturing example 1.

Manufacturing Example 5

Preparation of Copolymerized Polyester Resin

Except for using 30 mol % of 1,4-cyclohexanedimethanol and 70 mol % of ethylene glycol instead of 16 mol % of 1,4-cyclohexanedimethanol, 78 mol % of ethylene glycol and 6 mol % of isosorbide as the diol components, the copolymerized polyester resin was prepared according to the same manner of Manufacturing example 1.

Manufacturing Example 6

Preparation of Copolymerized Polyester Resin

Except for using 20 mol % of 1,4-cyclohexanedimethanol, 67 mol % of ethylene glycol and 13 mol % of diethylene glycol instead of 16 mol % of 1,4-cyclohexanedimethanol, 78 mol % of ethylene glycol and 6 mol % of isosorbide as the diol components, the copolymerized polyester resin was prepared according to the same manner of Manufacturing example 1.

Manufacturing Example 7

Preparation of Copolymerized Polyester Resin

Except for using 10 mol % of 1,4-cyclohexanedimethanol, 25 mol % of ethylene glycol and 65 mol % of isosorbide instead of 16 mol % of 1,4-cyclohexanedimethanol, 78 mol % of ethylene glycol and 6 mol % of isosorbide as the diol components, the copolymerized polyester resin was prepared according to the same manner of Manufacturing example 1.

Examples 1 to 4 and Comparative Examples 1 to 4

Preparation and Evaluation of Copolymerized Polyester Heat Shrinkable Film

Copolymerized polyester resins of Manufacturing examples 1 to 4 (Examples 1 to 4), copolymerized polyester resins of Manufacturing examples 5 to 7 (Comparative examples 1 to 3) and polyvinyl chloride (PVC) resin (Comparative example 4) were extruded with a blowing extruder or a twin-screw extruder, and then stretched by 1 to 4 times in a transverse (TD) direction to produce heat shrinkable films. The shrinkage initiation temperature of the produced heat shrinkable film was measured by using the method for measuring the heat shrinkage ratio described in (2). Namely, the temperature at which the shrinkage of the film is initiated was measured according to the same manner of measuring the heat shrinkage ratio. By using the above-mentioned methods, a glass transition temperature, a heat shrinkage ratio and a specific melting resistivity were measured and set forth in the following Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Glass transition temperature (Tg, °C.) | 85 | 95 | 103 | 102 | 80 | 71 | 120 | 65 |
| Shrinkage initiation temperature (°C.) | 73 | 79 | 85 | 84 | 65 | 62 | 108 | 50 |
| Maximum heat shrinkage ratio (at 65° C.) | 0% | 0% | 0% | 0% | 2% | 5% | 0% | 5% |
| Maximum heat shrinkage ratio (at 95° C.) | 81% | 81% | 80% | 75% | 79 | 78% | 0% | 65% |
| Specific melting resistivity (×10$^8$ Ω·cm) | 0.13 | 0.14 | 0.12 | 0.14 | 0.12 | 0.13 | 0.11 | 0.16 |

As shown Table 1, the heat shrinkage film of Examples 1 to 4 has glass transition temperature (Tg) of 85 to 103° C., and has an improved heat resistance. In addition, the heat shrinkage film of Examples 1 to 4 has high shrinkage initiation temperature of 73 to 85° C., and the maximum heat shrinkage ratio of 0% at 65° C. Therefore, when the heat shrinkable film of the present invention is used as a shrinkage label and so on, the shrinkage and deformation of the label can be prevented even when using hot drink of 60 to 70° C. Further, the heat shrinkage film of the present invention has the maximum heat shrinkage ratio of 75 to 81% at 95° C., and therefore the processability (shrinkage) of the heat shrinkable film is acceptable for a normal use. Also, the heat shrinkage film of the present invention has the specific melting resistivity of 0.12 to 0.14 which is equal to that of the conventional heat shrinkable film. In contrast, the heat shrinkable film not including isosorbide (Comparative examples 1, 2 and 4) has an inferior heat resistance and the maximum heat shrinkage ratio of 2% or more at 65° C. Thus, the heat shrinkable film of Comparative examples 1, 2 and 4 may be shrunk and be deformed by hot drink. The polyester heat shrinkable film including excessive isosorbide (Comparative example 3) has a good heat resistance. However, the shrinkage initiation temperature of the heat shrinkable film is too high to process or mould the film.

INDUSTRIAL APPLICABILITY

The copolymerized polyester heat shrinkable film according to the present invention is useful as a heat shrinkable film for a label, a cap seal or a direct packaging of various containers.

The invention claimed is:

1. A copolymerized polyester heat shrinkable film made of a copolymerized polyester resin having alternating structures of acid moieties which are derived from acid components and diol moieties which are derived from diol components, the acid components comprising terephthalic acid, and the diol components comprising isosorbide represented by Formula 1 and ethylene glycol,

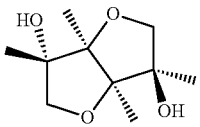

[Formula 1]

wherein the copolymerized polyester heat shrinkable film has a shrinkage initiation temperature of equal to or more than 60° C., and a maximum heat shrinkage ratio of less than 2% at 65° C., and a maximum heat shrinkage ratio of 80 to 90% at 95° C., wherein the diol components comprises 6 to 24 mol % of isosorbide represented by Formula 1, and 15 to 16 mol % of 1,4-cyclohexanedimethanol and ethylene glycol as a remainder, and wherein the copolymerized polyester resin has a specific melting resistivity of 0.12 to 0.14 Ω·cm.

2. The copolymerized polyester heat shrinkable film according to claim 1, wherein the heat shrinkable film is prepared by extruding the copolymerized polyester resin with a blowing extruder or a twin-screw extruder, and then stretching the extruded polyester by 1 to 4 times in transverse direction.

3. The copolymerized polyester heat shrinkable film according to claim 1, wherein the acid component further comprises a copolymerized acid component selected from the group consisting of an aromatic dicarboxylic acid component of 8 to 14 carbon atoms and an aliphatic dicarboxylic acid component of 4 to 12 carbon atoms.

4. The copolymerized polyester heat shrinkable film according to claim 1, wherein the copolymerized polyester heat shrinkable film has a shrinkage initiation temperature of 65 to 90° C.

5. The copolymerized polyester heat shrinkable film according to claim 1, wherein the copolymerized polyester heat shrinkable film has a maximum heat shrinkage ratio of 0% at 65° C.

6. The copolymerized polyester heat shrinkable film according to claim 1, wherein the copolymerized polyester heat shrinkable film has a maximum heat shrinkage ratio of 75 to 85% at 95° C.

* * * * *